United States Patent Office 3,451,958
Patented June 24, 1969

3,451,958
COMPOSITIONS COMPRISING POLYVINYL CHLORIDE AND EPOXIDIZED METHYL ESTERS OF MALEINIZED FATTY ACIDS
William L. Riedeman, West Windsor Township, Mercer County, and Andrew Lupichuk, Hamilton Township, Mercer County, N.J., assignors to FMC Corporation, New York, N.Y., a corporation of Delaware
No Drawing. Original application Jan. 18, 1962, Ser. No. 167,161. Divided and this application June 7, 1965, Ser. No. 462,085
Int. Cl. C08f 45/38, 45/58
U.S. Cl. 260—23
5 Claims This is a division of application Ser. No. 167,161, filed Jan. 18, 1962, now abandoned. This invention relates to novel compounds which are useful as plasticizers and stabilizers for poly(vinyl chloride) resins, and more particularly, it relates to epoxidized methyl esters of maleinized unsaturated fatty acids.

The most widely used primary plasticizer for poly(vinyl chloride) resins is dioctyl phthalate, which gives extremely good performance. However, because of its cost, in many cases, secondary plasticizers are used to extend the dioctyl phthalate plasticizer. These secondary plasticizers, such as partially hydrogenated terphenyl and chlorinated paraffin waxes, in some cases are used in substantial amounts; however they tend to bleed out of the resin, and in many cases they impart poor color characteristics to the resin.

Stabilizers, such as epoxidized vegetable oils, are commonly used with poly(vinyl chloride) resins in addition to the primary and secondary plasticizers. These stabilizers are scavengers which pick up the hydrogen chloride evolved during formulation and use of the resins, and which otherwise would autocatalyze decomposition of the resin. However, the reaction products resulting from such stabilizing action are incompatible with the resins and tend to bleed out. More recently, epoxidized tetrahydrophthalate esters have been suggested as stabilizers, the stabilization reaction products of which remain compatible and do not bleed out. However, these esters have not been widely accepted, primarily because of their relatively high cost.

It is the object of this invention to provide a relatively inexpensive primary plasticizer and stabilizer for poly(vinyl chloride) resins.

This and other objects will become apparent from the following description of this invention.

We have now found that epoxidized methyl esters of maleinized fatty acids selected from the group consisting of oleic and tall oil fatty acids have outstanding properties as plasticizers and stabilizers for poly(vinyl chloride) resins. Unlike conventional stabilizers, the compounds of this invention are highly compatible with vinyl chloride resins, and thus have no tendency to bleed out. Moreover, these novel compounds have the advantage of being cheaper than conventional epoxy stabilizers.

The epoxidized methyl esters of maleinized unsaturated fatty acids of this invention are prepared by first condensing maleic anhydride with the fatty acid. The maleic anhydride adds to the fatty acid through the carbon atom alpha to the double bond. Using oleic acid as the example:

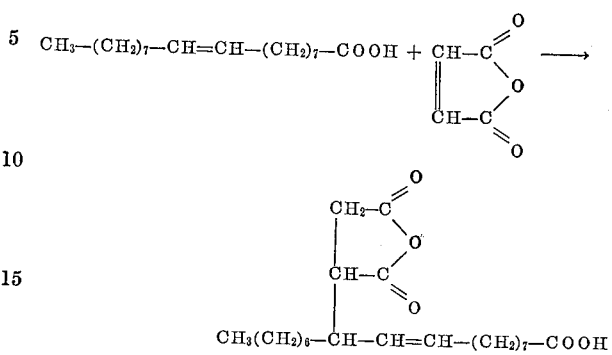

Since there are 2 carbon atoms alpha to the double bond, a mixture of isomers is obtained. In the case of tall oil fatty acid, which is approximately a 1:1 mixture of oleic and linoleic acids, the linoleic constituent is capable of adding 2 moles of maleic anhydride, and the number of isomers increases accordingly. The malenized fatty acid is then esterified with methyl alcohol as follows:

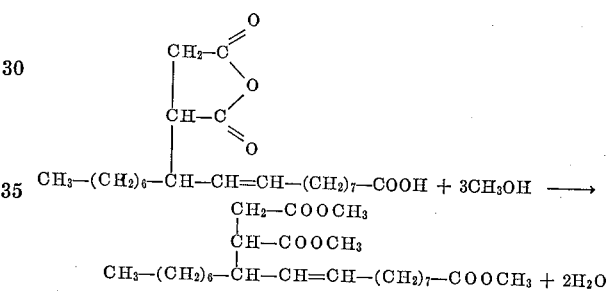

The methyl ester of the maleinized fatty acid is then epoxidized as follows:

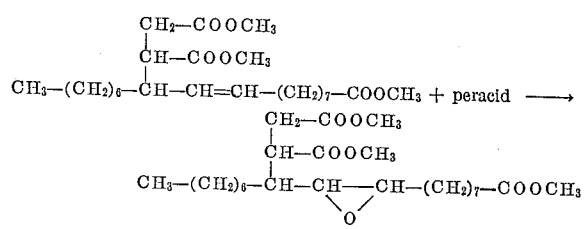

When the fatty acid is tall oil fatty acid, both double bonds in the linoleate portion may be epoxidized.

The maleinization of the unsaturated fatty acid is carried out by reacting an excess of maleic anhydride with the fatty acid at elevated temperatures. The stoichiometric amount of maleic anhydride is 1 mole of anhydride for each double bond equivalent of fatty acid. In the case of oleic acid, 1 mole of acid contains 1 equivalent. For tall oil fatty acid, 1 mole of acid contains about 1.5 equivalents. However, in the case of tall oil fatty acid, it is sufficient to react 1 mole of maleic anhydride with each mole of fatty acid, since it is not necessary that more than 1 maleic moiety be introduced into the linoleic acid constituent. The maleic anhydride should be present in excess of the amount which is desired to react. This excess may vary from about 1% to over 100%. Preferably, an excess of at least about 10% is employed.

The reaction temperature of the maleinization reaction is generally in the range of about 150–300° C., and preferably about 180–250° C. The reaction is suitably carried out at atmospheric pressure, although elevated pressures may be used, if desired. The eraction time will vary from about 1–10 hours, depending upon the other reaction conditions employed. The maleinization of fatty acids is fully discussed by W. G. Bickford et al., Journal of the American Oil Chemists' Society, July (1948), pages 254–257.

The esterification of the maleinized fatty acid is carried out using conventional techniques by reacting methanol with the maleinized fatty acid at elevated temperatures in the presence of an acid catalyst, such as sulfuric acid. The reaction is readily carried out by refluxing the medium for extended periods of time, or the reaction can be conducted at elevated pressures in a closed vessel. In the case of maleinized oleic acid, 3 moles of methanol will be required for each mole of maleinized acid. When maleinized tall oil is used, 3–4 moles of methanol will be required depending upon the degree of maleinization. An excess of methanol over that required may be used, if desired; however, it is not necessary.

The esterified maleinized fatty acid may be epoxidized by any of the various procedures well known in the art. Lower aliphatic peracids such as performic, peracetic, perpropionic and perbutyric acids are generally used as the epoxidizing agent. The epoxidation reaction may be carried out using a preformed peracid mixture, or the peracid may be formed in situ, generally by adding hydrogen peroxide to an aliphatic acid or anhydride medium. Preformed peracids may be prepared in any known way, such as described in Organic Synthesis, Reinhold Publishing Corp. (1957), page 302. Preferably, the epoxidizing agent is peracetic acid or performic acid.

When preformed peracid is used as the epoxidizing medium, the peracid is mixed with the maleinized fatty ester at a temperature below about 25° C. The mixing should be done over an extended period of time, or with cooling. After all the reactants have been mixed, the system is further agitated for about 1–3 hours at a temperature below 25° C. After the epoxidation appears to be complete at the moderate temperature, the temperature of the reaction medium is raised to about 50–60° C., and the reaction is continued under agitation for an additional period of about 0.5–2 hours. This epoxidation technique is fully described by F. P. Greenspan and R. J. Gall in U.S. Patent No. 2,692,271.

When the in situ epoxidation method is used, the reaction may be carried out by reacting the maleinized fatty acid ester with a mixture of hydrogen peroxide and formic acid in the presence of a solvent at a temperature in the range of about 50–100° C. This process is fully described by F. P. Greenspan and R. J. Gall in U.S. Patent 2,774,774.

The epoxidation may also be carried out by the in situ formation of peracetic acid using either sulfuric acid or a sulfonic cation exchange resin as catalyst. By this method the maleinized fatty acid ester is reacted at a temperature of about 60–100° C. with hydrogen peroxide, acetic acid, and the catalyst. This epoxidation procedure is described in more detail by F. P. Greenspan and R. J. Gall in U.S. patents, Nos. 2,801,253 and 2,919,283.

The epoxidation reaction may be conducted using stoichiometric amounts of the peracid; that is, 1 mole of peracid for each double bond equivalent in the fatty acid. Thus 1 mole of peracid is equivalent to 1 mole of oleic acid, and 1.5 moles of peracid are equivalent to 1 mole of tall oil fatty acid. The epoxidation reaction may be carried out using excess epoxidizing agent, or less than the stoichiometric amount may be used, if desired. Useful products are obtained when the epoxidized product contains at least about 0.5% by weight of oxirane oxygen. The maximum theoretical amount of oxirane oxygen possible for the methyl ester of maleinized oleic acid is 3.5%, while the maximum for the methyl ester of maleinized tall oil fatty is 4.5%. A convenient method for controlling the amount of epoxidation is taught by F. P. Greenspan in U.S. Patent No. 2,810,733.

The epoxidized methyl esters of maleinized fatty acids taught herein are particularly useful as primary plasticizers and stabilizers for poly(vinyl chloride) resins, although they are also suitable for other vinyl resins such as vinylidene chloride polymers, vinyl chloride-vinyl acetate copolymers, etc. The amount of plasticizer-stabilizer used will vary from about 1–100 parts per 100 parts of resin depending upon the desired result. When the epoxidized ester is used primarily as a stabilizer 1–25 parts per 100 parts of resin will be used, and preferably 5–15 parts. When the epoxidized ester is used as the sole plasticizer, the amount will be in the range of about 45–100 parts per 100 parts of resin, and preferably 50–65 parts. The plasticizer may be blended with the resin by any conventional manner, such as on a plastics mill.

The following examples, illustrating the novel products disclosed herein, their preparation and their utility, are given without any intention that the invention be limited thereto. All parts and percentages are by weight.

EXAMPLE 1

Oleic acid was maleinized as follows: Five hundred sixty-five grams of oleic acid and 392 g. of maleic anhydride were charged to a flask equipped with a stirrer, thermometer and water-cooled reflux condenser. Heat was applied, and after the maleic anhydride had dissolved at about 60° C., vigorous stirring was initiated. The reaction mixture was heated rapidly to 200° C. and maintained at this temperature for 6 hrs. The reaction product was cooled and taken up in 3 l. of benzene, and the solution was washed with several portions of hot water to remove excess maleic anhydride. After drying over anhydrous $MgSO_4$, the solution was stripped at 95–100° C. using reduced pressure and finally at 0.5 mm. Hg. The product was an amber liquid containing 714 g. of maleinized oleic acid having an iodine number of 63 and an acid number of 286.

The maleinized oleic acid was esterified as follows: Five hundred fifty grams of maleinized oleic acid, 3.5 l. of methanol and 30 ml. of concentrated $H_2SO_4$ were charged to a flask equipped with a water-cooled reflux condenser, strirrer, and thermometer. Heat was applied, and the reaction mixture was maintained at reflux temperature for a period of 24 hours. The excess alcohol and the water of reaction were stripped off at 100° C. under reduced pressure. The crude product was fractionated at 0.04 mm. Hg. The trimethyl ester of maleinized oleic acid was collected as the fraction boiling at 143–210° C. and found to have an iodine number of 59.

The trimethyl ester of maleinized oleic acid was epoxidized as follows: Four hundred eighteen grams of the ester was dissolved in its own weight of benzene. Seventy-seven grams of peracetic acid, 17.6 grams of NaOH and 1 gram of ethylenedinitrilotetraacetic acid were added. The reaction mixture was maintained at 25° C. with stirring for 21 hrs. and then at 50° C. for 5 hrs. The organic layer was washed with water, followed by repeated washings with 0.1 N aqueous NaOH until neutral. Palladium-on-charcoal was added to decompose the peroxides. The mixture was filtered, dried over $MgSO_4$ and vacuum stripped. The resulting epoxidized trimethyl ester of maleinized oleic acid had an oxirane content of 1.3% and an iodine number of 14.

A poly(vinyl chloride) resin composition containing the epoxidized trimethyl ester of maleinized oleic acid was prepared as follows: One hundred parts of a high molecular weight poly(vinyl chloride) resin (Geon-101) was blended on a plastics mill with 1.5 parts of a Ba-Cd complex organic stabilizer and 55 parts of the epoxidized trimethyl ester of maleinized oleic acid. The blend was sheeted out and samples were tested for heat stability using ASTM test method D620–57T and ultraviolet light stability using ASTM test method D1501–57T for 200 hours without a fog chamber. Thin samples were sheeted out and tested for weight loss by extraction with water and with oil using the procedure described on page 64 of the Plasticizers catalogue (1958) of the Ohio-Apex Division of FMC Corp. Weight loss by carbon volatility was measured in accordance with ASTM test method D1203–55. Additional samples of the plasticized resin were compression molded for 5 min. at 170° C. and tested to determine modulus at 100% elongation, ultimate tensile strength and ultimate elongation using ASTM test method D412–61T with a type C dumbbell. Hardness was measured by ASTM test method D1706–59T using a type A Shore Durometer, and low temperature flexibility following ASTM test method D1043–51.

For comparison, an additional poly(vinyl chloride) resin was prepared following the above procedure except that dioctyl phthalate was used as the plasticizer. Samples of this resin were tested as before.

EXAMPLE 2

Tall oil fatty acid was maleinized as follows: Thirteen hundred six grams of tall oil fatty acid, consisting primarily of oleic and linoleic acids in a 1:1 ratio, and 1200 grams of maleic anhydride were charged to a flask equipped with stirrer, thermometer, water-cooled reflux condenser and electric heating mantle. The temperature was raised to 200° C. and maintained at this level for 4 hrs. After partial cooling, the reaction mixture was taken up in 2 l. of benzene. The resulting solution was washed with several portions of water, dried over anhydrous MgSO$_4$, filtered and stripped as described in Example 1. As product, 1938 g. of maleinized tall oil fatty acid containing an average of 1.47 maleic groups per molecule was obtained as a brown viscous liquid having an iodine number of 49 and an acid number of 350.

The maleinized tall oil fatty acid was esterified as follows: Nineteen hundred grams of maleinized tall oil fatty acid was reacted with methanol in the presence of H$_2$SO$_4$ following the procedure set forth in Example 1. The crude product was fractionated under reduced pressure to give 1114 g. of methyl ester of maleinized tall oil fatty acid, distilling at 180–255° C. at a pressure of 0.05 mm. Hg and having an iodine number of 63 and an acid number of 0.5.

The methyl ester of maleinized tall oil fatty acid was epoxidized as follows: Four hundred thirty grams of the ester was dissolved in 700 ml. of chloroform containing 36 g. of 90% formic acid and 1 g. of ethylenedinitrilotetraacetic acid. The temperature was maintained at 50° C., with stirring, while 95 g. of 50% hydrogen peroxide was added dropwise over a 2.5 hr. period. The organic layer was washed with water, followed by repeated washings with 0.1 N aqueous NaOH until neutral. Palladium-on-charcoal was added to decompose peroxides. The mixture was filtered, dried over MgSO$_4$ and vacuum stripped. The resulting epoxidized methyl ester of maleinized tall oil fatty acid had an iodine number of 29 and contained 1.1% oxirane oxygen.

A poly(vinyl chloride) resin was plasticized using the epoxidized methyl ester of maleinized tall oil fatty acid as the plasticizer following the procedure of Example 1. The data obtained from the tests of the poly(vinyl chloride) resins of Examples 1 and 2 are given in the following table.

| Formulation: | | | |
|---|---|---|---|
| Poly (vinyl chloride) resin | 100 | 100 | 100 |
| Ba-Cd complex organic stabilizer | 1.5 | 1.5 | 1.5 |
| Epoxidized methyl triester of maleinized oleic acid | 55 | | |
| Epoxidized methyl ester of maleinized tall oil fatty acid | | 55 | |
| Dioctyl phthalate | | | 55 |
| Tests: | | | |
| Modulus at 100% elongation, p.s.i. | 1,345 | 1,670 | 1,435 |
| Ult. tensile strength, p.s.i. | 2,800 | 2,990 | 2,620 |
| Ult. elongation, percent | 374 | 347 | 334 |
| Hardness, Shore dur. A | 74 | 77 | 75 |
| Low temp. flexibility, °C | −27 | −31.5 | −33 |
| Weight loss in water 10 days at 25° C., percent | 0.6 | 0.6 | 0.3 |
| Weight loss in oil 10 days at 25° C., percent | 6.9 | 2.5 | 12.5 |
| Loss, carbon volatility, percent | 1.6 | 0.83 | 1.5 |
| Heat stability: | | | |
| Pt-Co color No. 50, min | 25 | 15 | 45 |
| Pt-Co color No. 500, min | 220 | 30 | 55 |
| Black, min | >220 | >210 | >90 |
| Ultraviolet light stability: | | | |
| 200 hours color change | (¹) | (²) | (²) |
| Bleed | None | None | None |

¹ No change.
² Slight yellow.

As will be apparent to those skilled in the art, variations in the degree of maleinization and epoxidation of the novel compounds of this invention may be made without departing from the spirit of the invention or the scope of the following claims.

We claim:
1. The plasticized resin composition which comprises poly(vinyl chloride) resin containing, as plasticizer and stabilizer, 1–100 parts by weight, per 100 parts of resin, of the epoxidized, completely methylated ester of maleinized fatty acid, said acid being selected from the group consisting of oleic and tall oil fatty acids, and being maleinized to the extent of essentially 1 mole of maleic moiety per mole of oleic acid in the case of oleic acid and in the case of the tall oil fatty acids to a range of essentially 1 to 1.5 moles of maleic moiety per mole of unsaturated fatty acid in said tall oil fatty acid and said ester containing 0.5% to 1.3% by weight of oxirane oxygen.

2. The plasticized resin composition which comprises poly(vinyl chloride) resin containing, as plasticizer, 50–65 parts by weight, per 100 parts of resin, of the epoxidized trimethyl ester of maleinized oleic acid the said acid being maleinized to the extent of essentially 1 mole of maleic moiety per mole of oleic acid, and said ester containing 0.5% to 1.3% by weight of oxirane oxygen.

3. The plasticized resin composition which comprises poly(vinyl chloride) resin containing, as plasticizer, 50–65 parts by weight, per 100 parts of resin, of the epoxidized, completely methylated ester of maleinized tall oil fatty acid the said acid being maleinized to a range of essentially 1 to 1.5 moles of maleic moiety per mole of acid, and said ester containing 0.5% to 1.3% by weight of oxirane oxygen.

4. The plasticized resin composition which comprises poly(vinyl chloride) resin containing, as stabilizer, 5–15 parts by weight, per 100 parts of resin, of the epoxidized trimethyl ester of maleinized oleic acid the said acid being maleinized to the extent of essentially 1 mole of maleic moiety per mole of oleic acid, and said ester containing 0.5% to 1.3% by weight of oxirane oxygen.

5. The plasticized resin composition which comprises poly(vinyl chloride) resin containing, as stabilizer, 5–15 parts by weight, per 100 parts of resin, of the epoxidized, completely methylated ester of maleinized tall oil fatty acid the said acid being maleinized to a range of essentially 1 to 1.5 moles of maleic moiety per mole of acid, and said ester containing 0.5% to 1.3% by weight of oxirane oxygen.

(References on following page)

References Cited

UNITED STATES PATENTS

| | | | |
|---|---|---|---|
| 2,809,947 | 10/1957 | Dazzi | 260—23 |
| 2,865,931 | 12/1958 | Mack et al. | 260—348 |
| 2,997,454 | 8/1961 | Leistner et al. | 260—45.7 |

OTHER REFERENCES

Komori et al., Chem. Abstr., vol. 55 (1961), p. 25331a.
Shigeno et al., Chem. Abstr., vol. 50 (1956), p. 15119c.
Shigeno et al., Chem. Abstr., vol. 51 (1957), p. 9208a.

DONALD E. CZAJA, *Primary Examiner.*

R. A. WHITE, *Assistant Examiner.*

U.S. Cl. X.R.

260—30.4, 31.8, 45.75, 45.8, 348